United States Patent
Ohtani

(10) Patent No.: US 9,172,884 B2
(45) Date of Patent: Oct. 27, 2015

(54) IMAGING APPARATUS

(71) Applicant: Panasonic Corporation, Osaka (JP)

(72) Inventor: Yoshihiro Ohtani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/339,635

(22) Filed: Jul. 24, 2014

(65) Prior Publication Data

US 2015/0055226 A1  Feb. 26, 2015

(30) Foreign Application Priority Data

Aug. 21, 2013  (JP) ................. 2013-171032
Jun. 17, 2014  (JP) ................. 2014-124003

(51) Int. Cl.
  *H04N 5/232*  (2006.01)
  *G03B 13/34*  (2006.01)
  *G02B 7/10*   (2006.01)

(52) U.S. Cl.
  CPC ............ *H04N 5/23296* (2013.01); *G02B 7/102* (2013.01); *G03B 13/34* (2013.01); *G03B 2205/0046* (2013.01); *G03B 2205/0092* (2013.01)

(58) Field of Classification Search
  CPC ...................................................... G02B 7/102
  See application file for complete search history.

(56) References Cited

U.S. PATENT DOCUMENTS 7,782,548 B2   8/2010  Yumiki et al.
2013/0050568 A1*  2/2013  Adachi et al. ............... 348/345

FOREIGN PATENT DOCUMENTS

JP  2010-079250 A   4/2010
JP  2012-042635 A   3/2012

* cited by examiner

*Primary Examiner* — Clayton E Laballe
*Assistant Examiner* — Noam Reisner
(74) *Attorney, Agent, or Firm* — Renner, Otto, Boisselle & Sklar, LLP

(57) ABSTRACT

The imaging apparatus includes a focus lens, a front zoom lens disposed on a subject side of the focus lens, a rear zoom lens disposed on an image side of the focus lens, a focus drive unit configured to drive the focus lens, a zoom drive unit configured to drive the front and rear zoom lenses, a focus origin point detector provided in a movable range of the rear zoom lens, configured to detect a focus origin point of the focus lens, and a controller configured to control the focus drive unit and the zoom drive unit. When the controller loses track of a position of the focus lens, the controller drives the focus lens in accordance with a relative movement amount of the front and rear zoom lenses by the zoom drive unit to move the focus lens to the focus origin point.

3 Claims, 8 Drawing Sheets

IMAGING APPARATUS

BACKGROUND OF THE INVENTION

1. Field of the Invention

The present disclosure relates to an imaging apparatus that performs initialization control of lens.

2. Description of the Related Art

Unexamined Japanese Patent Publication No. 2012-42635 discloses an imaging apparatus that estimates a direction of an origin point position and determines an initial driving direction for performing origin point detection in focus lens origin point detection processing.

SUMMARY OF THE INVENTION

The present disclosure provides an imaging apparatus that prevents a collision between lenses when the imaging apparatus loses track of initial positions of the lenses.

The imaging apparatus includes a focus lens, a front zoom lens disposed on a subject side of the focus lens, a rear zoom lens disposed on an image side of the focus lens, a focus drive unit configured to drive the focus lens, a zoom drive unit configured to drive the zoom lenses, a focus origin point detector provided in a movable range of the rear zoom lens, configured to detect a focus origin point of the focus lens, and a controller configured to control the focus drive unit and the zoom drive unit. When the controller loses track of a position of the focus lens, the controller drives the focus lens in accordance with a relative movement amount of the zoom lenses by the zoom drive unit to move the focus lens to the focus origin point.

According to the present disclosure, the imaging apparatus prevents collision between lenses when the imaging apparatus loses track of initial positions of the lenses.

DETAILED DESCRIPTION OF THE PREFERRED EMBODIMENT

Hereinafter, an exemplary embodiment is described in detail with reference to the drawings as appropriate. However, descriptions detailed more than necessary may be omitted. For example, detailed descriptions of already well-known matters and redundant descriptions of substantially the same structures may be omitted. This is to prevent the following description from being unnecessary redundant to facilitate understanding by persons skilled in the art.

The accompanying drawings and the following description are presented for persons skilled in the art to fully understand the present disclosure. These are not intended to limit the subject described in the claims.

Exemplary Embodiment

1. Configuration of Digital Camera 100

Hereinafter, with reference to the drawings, a configuration of a digital camera, which is an imaging apparatus of the present disclosure, is described.

Figure 1:
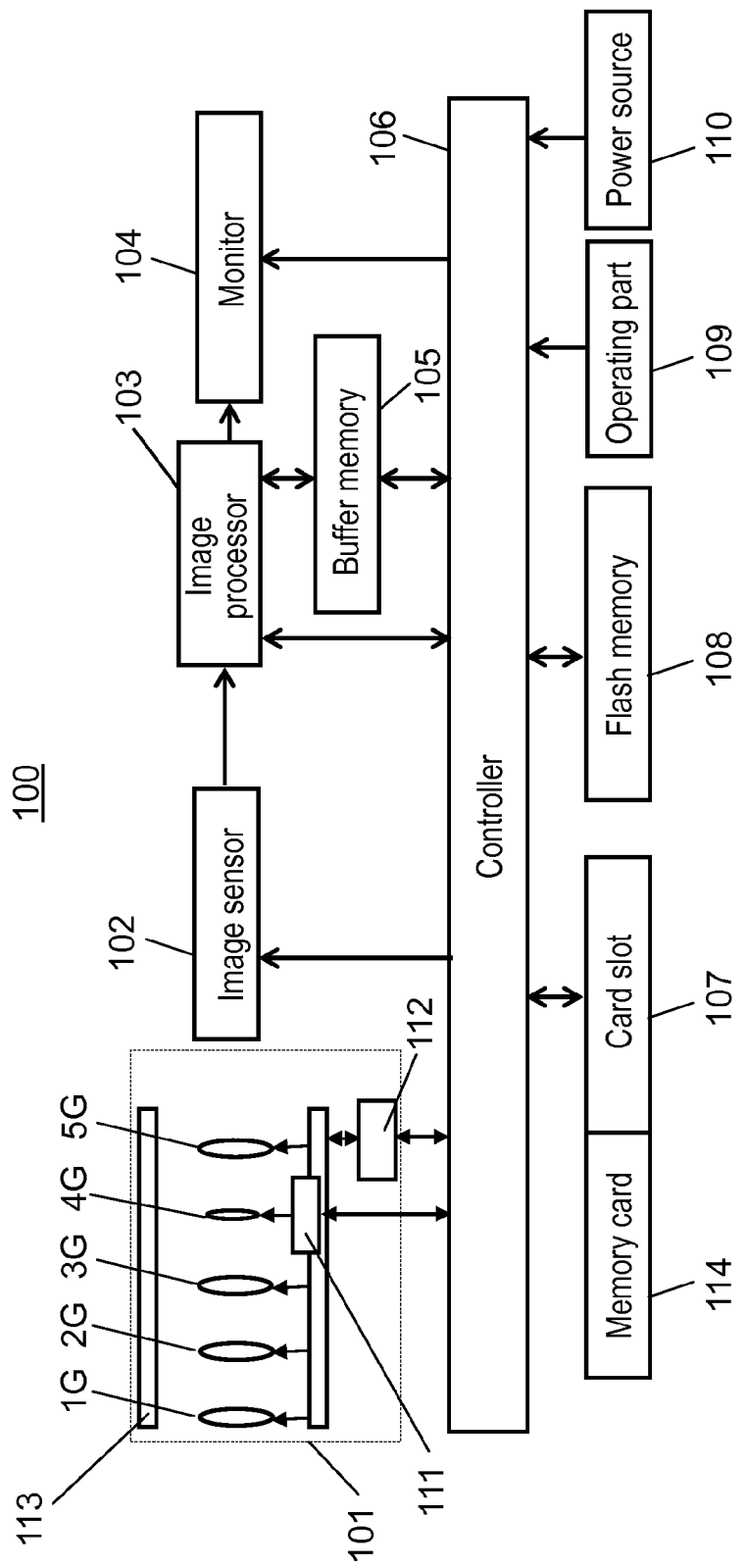
FIG. 1 is a block diagram of a digital camera according to an exemplary embodiment.

FIG. 1 is a block diagram of digital camera 100.

Digital camera 100 includes optical system 101, image sensor 102, image processor 103, monitor 104, buffer memory 105, controller 106, card slot 107, flash memory 108, operating part 109, and power source 110.

Digital camera 100 captures, by image sensor 102, an image of a subject formed by optical system 101. Image sensor 102 generates imaging data based on the captured subject image. The generated imaging data is subjected to various kinds of processing in image processor 103 to generate image data. The generated image data is recorded in flash memory 108 or memory card 114. The image data recorded in flash memory 108 or memory card 114 is displayed on monitor 104 upon reception of an operation of operating part 109 by a user.

Optical system 101 includes focus lens group 4G, zoom lens groups 1G, 2G, 3G, and 5G, focus control unit 111, zoom control unit 112, and zoom drive mechanism 113. Focus lens group 4G includes a focus lens and a focus lens frame. Zoom lens groups 1G, 2G, 3G, and 5G include respective zoom lenses and zoom lens frames. Zoom lens group 3G further includes a shutter, an iris, and an Optical Image Stabilizer (OIS) mechanism.

Focus lens group 4G is used for adjustment of a focusing position. Focus control unit 111 drives focus lens group 4G in an optical axis direction responding to a control signal transmitted from controller 106. Focus control unit 111 includes a focus motor and a focus origin point detector. The focus motor is realized by a stepping motor, for example. The focus motor moves focus lens group 4G. The focus origin point detector is realized by a Photo Interrupter (PI) sensor. The focus origin point detector outputs "H" or "L" to controller 106, according to a position of focus lens group 4G.

Zoom lens groups 1G, 2G, 3G, and 5G are used for adjustment of a scaling factor. Zoom control unit 112 and zoom drive mechanism 113 drive zoom lens groups 1G, 2G, 3G, and 5G simultaneously in an optical axis direction responding to a control signal transmitted from controller 106. Zoom control unit 112 includes a zoom motor, a drive gear, a zoom origin point detector, and a rotary encoder. Zoom drive mechanism 113 is driven by the zoom motor and the drive gear of zoom control unit 112. The zoom motor is realized by a DC motor, for example. The rotary encoder performs position control of the zoom motor. Zoom drive mechanism 113 is composed of a plurality of cylindrical cam frames. When driven by the zoom motor and the drive gear, zoom drive mechanism 113 moves zoom lens groups 1G, 2G, 3G, and 5G. The zoom origin point detector outputs "H" or "L" to controller 106, according to positions of zoom lens groups 1G, 2G, 3G, and 5G.

Image sensor 102 generates imaging data of a new frame at regular time intervals from light focused through optical system 101.

Image processor 103 performs various kinds of processing on imaging data outputted from image sensor 102 to generate image data. The various kinds of processing include calculation of an evaluation value, smear correction, white balance correction, gamma correction, YC conversion processing, electronic zoom processing, compression processing, and expansion processing, for example, but are not limited to them. Image processor 103 may include a hard-wired electronic circuit or may include a microcomputer using a program. Alternatively, image processor 103 may include a single semiconductor chip together with controller 106 and other components.

Monitor 104 is disposed at a back of digital camera 100. Monitor 104 displays an image based on image data processed in image processor 103. Images displayed by monitor 104 include a through image and a recorded image. A through image is an image of a new frame generated at regular time intervals by image sensor 102 and displayed continuously. By seeing a through image displayed on monitor 104, the user takes an image, checking a composition of a subject. A recorded image is an image recorded in memory card 114 or flash memory 108. Monitor 104 displays an image based on previously-recorded image data in response to an operation of the user.

Controller 106 centrally controls an entire operation of digital camera 100. Controller 106 may include a hard-wired electronic circuit, or may include a microcomputer or the like. Alternatively, controller 106 may include a single semiconductor chip together with image processor 103 and other components.

Flash memory 108 functions as an internal memory for recording image data and the like. Flash memory 108 stores a program for centrally controlling the entire operation of digital camera 100 in addition to programs for Auto Focus (AF) control and communication control.

Buffer memory 105 is a storage unit functioning as a work memory for image processor 103 and controller 106. Buffer memory 105 can be realized by a Dynamic Random Access Memory (DRAM) or the like. Buffer memory 105 includes a storage battery, and can hold a given signal by electric power of the storage battery even when power supply from power source 110 is stopped.

Card slot 107 is a connecting unit for allowing memory card 114 to be inserted and removed. Card slot 107 can electrically and mechanically connect memory card 114. Card slot 107 may have a function of controlling memory card 114.

Memory card 114 is an external memory including a recording element such as a flash memory therein. Memory card 114 can record data such as image data processed by image processor 103.

Power source 110 supplies electric power to each component of digital camera 100. Power source 110 may be a battery, or may supply electric power from AC power via a cable.

Operating part 109 is a generic name for members that receive operations from the user, and includes an operation button, an operating lever, a touch panel, and others provided to an exterior of digital camera 100. When receiving an operation by the user, operating part 109 transmits various operation instruction signals to controller 106. Operating part 109 includes a power switch that switches a state of power supply to digital camera 100 by power source 110 between an ON state and an OFF state.

2. Moving Ranges of Zoom Lens Groups 3G and 5G and Focus Lens Group 4G

Figure 2:
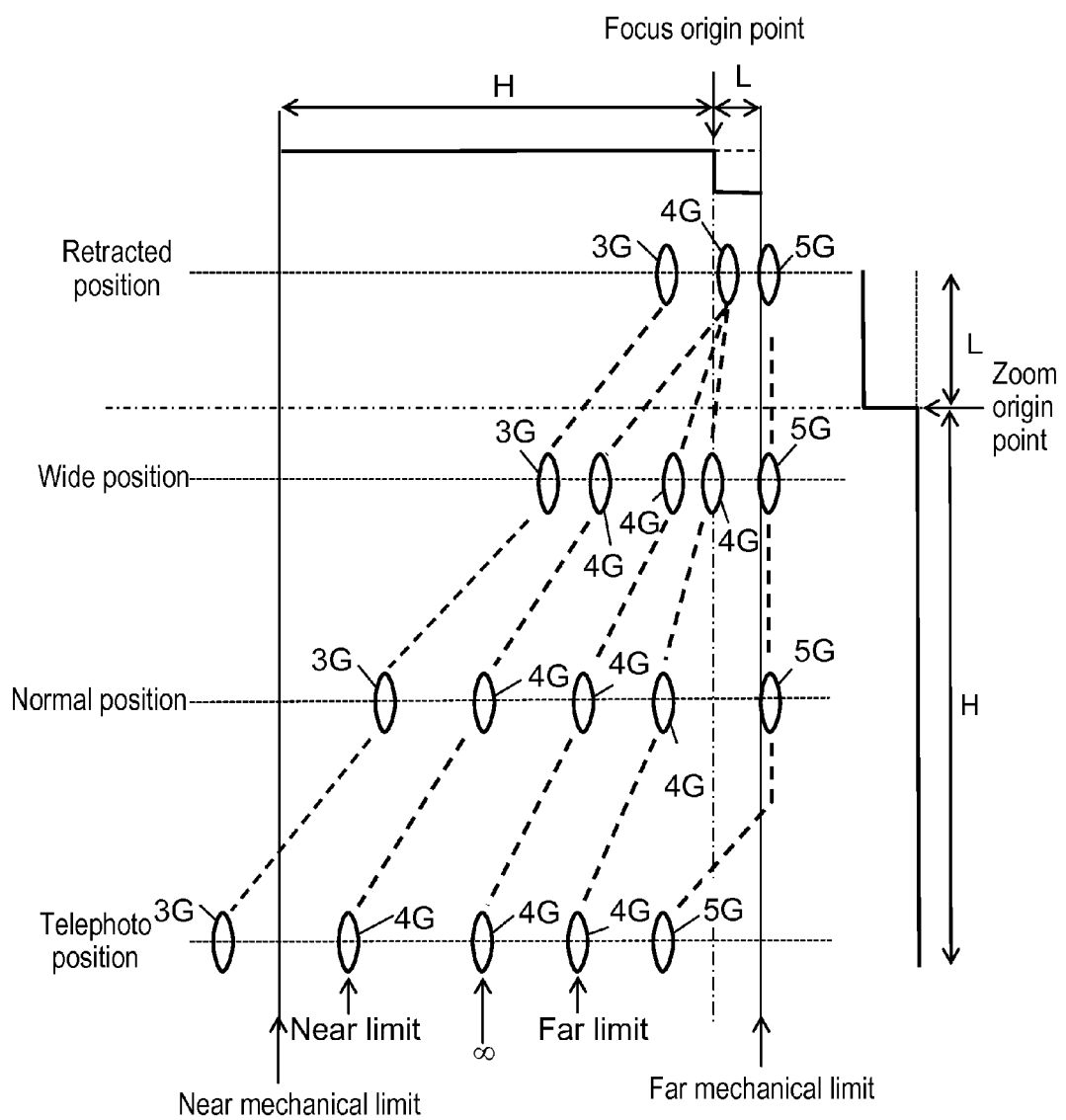
FIG. 2 is a diagram illustrating movements of zoom lens groups 3G and 5G and focus lens group 4G.

FIG. 2 is a diagram illustrating movements of zoom lens groups 3G and 5G and focus lens group 4G. Lens positions of zoom lens groups 3G and 5G and focus lens group 4G include a retracted position, a wide position, a normal position, and a telephoto position. FIG. 2 shows the lens positions and respective relative positions of zoom lens groups 3G and 5G and focus lens group 4G with respect to the lens positions. Dotted lines show positions during movement from one lens position to another lens position. The retracted position is a position when a lens is retracted in digital camera 100, that is, a position to which the lens moves when the power switch of operating part 109 of digital camera 100 is operated to OFF. The wide position is a position in which a focal length of a zoom lens is the shortest. The normal position is a position in which a focal length of a zoom lens is normal. The telephoto position is a position in which a zoom lens focal length is the longest.

Here, the left side in FIG. 2 is a subject side. When the power switch of operating part 109 of digital camera 100 is operated to ON, in order for zoom lens groups 3G and 5G and focus lens group 4G to move from the retracted positions to the wide positions, zoom lens groups 3G and 5G are extended. Then, when a zoom operation on operating part 109 by the user is received, zoom lens groups 3G and 5G are extended to the normal positions or the telephoto positions in accordance with a lens position received. Here, the lens position of focus lens group 4G is moved by AF control within a range predetermined with respect to zoom lens groups 3G and 5G.

Here, mechanical limits of a moving range of focus lens group 4G are a "Near mechanical limit" and a "Far mechanical limit" shown in FIG. 2. Zoom control unit 112 and focus control unit 111 independently drive the lens groups. Focus control unit 111 controls focus lens group 4G in such a manner as to drive focus lens group 4G within a range in which focus lens group 4G does not collide with zoom lens groups 3G and 5G, and further allows focus lens group 4G to be adjusted in focus. FIG. 2 shows a range in which collision with zoom lens group 3G or zoom lens group 5G is avoided as "Near Limit" and "Far Limit." "∞" between "Near Limit" and "Far Limit" indicates a lens position in which a focusing state of the focus lens is infinite.

In FIG. 2, the focus origin point is set between the retracted position and an "∞" position of the wide positions of focus lens group 4G. Therefore, when focus lens group 4G is extended from the focus origin point, an output of the focus origin point detector becomes "H," and when focus lens group 4G is retracted from the focus origin point, an output of the focus origin point detector becomes "L."

In FIG. 2, the zoom origin point is set between the retracted positions and the wide positions of zoom lens groups 3G and 5G. Therefore, when zoom lens group 3G is extended from the zoom origin point, an output of the zoom origin point detector becomes "H," and when zoom lens group 3G is retracted from the zoom origin point, an output of the zoom origin point detector becomes "L."

3. Normal Termination and Abnormal Termination of Digital Camera 100

Digital camera 100 is configured to check whether a termination in previous use is a normal termination or an abnormal termination when the power switch of operating part 109 is operated to ON. In this exemplary embodiment, determination is made by a flag indicating whether a termination is normal or not recorded in buffer memory 105 of digital camera 100.

When the power switch of operating part 109 is operated to ON, digital camera 100 records, in buffer memory 105, "0" as the flag indicating whether a termination is normal or not, and controller 106 moves zoom lens groups 1G, 2G, 3G, and 5G in optical system 101 to the wide positions by using zoom control unit 112 and zoom drive mechanism 113, and moves focus lens group 4G to the wide position "∞" by using focus control unit 111.

Thereafter, when the power switch is operated from ON to OFF in digital camera 100, controller 106 moves zoom lens groups 1G, 2G, 3G, and 5G in optical system 101 to the retracted positions by using zoom control unit 112 and zoom drive mechanism 113, and moves focus lens group 4G to the retracted position by using focus control unit 111. Then, controller 106 records, in buffer memory 105, "1" as the flag indicating whether the termination is normal or not, and stops power supply to each component.

On the other hand, when a battery or the like of power source 110 as a power supply source is removed from digital camera 100 while the power is ON, for example, power supply to each component is abruptly stopped. In such a case, power supply is stopped, leaving controller 106 unable to move zoom lens groups 1G, 2G, 3G, and 5G and focus lens group 4G in optical system 101 to the retracted positions. Further, digital camera 100 cannot record, in buffer memory 105, "1" as the flag indicating whether the termination is normal or not, and "0" is left recorded.

When the power switch of operating part 109 is operated to ON, digital camera 100 can check whether the termination in previous use was a normal termination or an abnormal termination by checking the flag indicating whether the termination is normal or not. Specifically, when "1" is recorded as the flag indicating whether the termination is normal or not, it can be determined that the termination in the previous use is a normal termination, and when "0" is recorded as the flag indicating whether the termination is normal or not, it can be determined that the termination in the previous use is an abnormal termination.

4. Problems in Abnormal Termination of Digital Camera 100

Next, problems when a termination in previous use is an abnormal termination are described.

When a termination in previous use is an abnormal termination, digital camera 100 does not know which positions the lens positions of zoom lens groups 1G, 2G, 3G, and 5G and focus lens group 4G are. Therefore, it is desired to first retract the lens position of focus lens group 4G to a position closer to an image than the focus origin point, that is, to a position in which an output of the focus origin point detector is "L" so that the lens position of focus lens group 4G is moved to a lens position substantially the same as the position when a termination in previous use is a normal termination.

Figure 3:
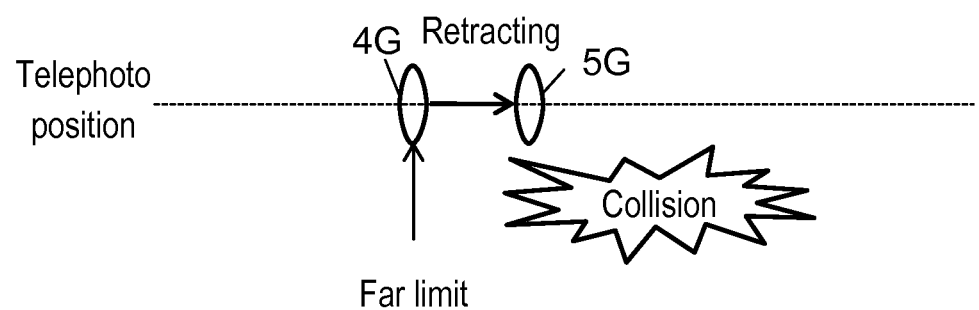
FIG. 3 is a diagram illustrating a problem when a termination in previous use of the digital camera according to the exemplary embodiment is an abnormal termination.

FIG. 3 is a diagram illustrating a problem when a termination in previous use of digital camera 100 is an abnormal termination. FIG. 3 shows each location of zoom lens group 5G and focus lens group 4G. Suppose that when a termination in previous use is an abnormal termination, with zoom lens group 5G in the telephoto position and with focus lens group 4G in the "Far limit" position of the telephoto positions, the power is turned OFF. When the power switch of operating part 109 is operated to ON, in an attempt to retract focus lens group 4G without retracting zoom lens group 5G, focus lens group 4G, when being retracted beyond the "Far limit" position may collide with zoom lens group 5G in the telephoto position. Even when simultaneously retracted, zoom lens group 5G and focus lens group 4G are controlled separately to be driven, and thus there is a possibility of collision.

Figure 4:
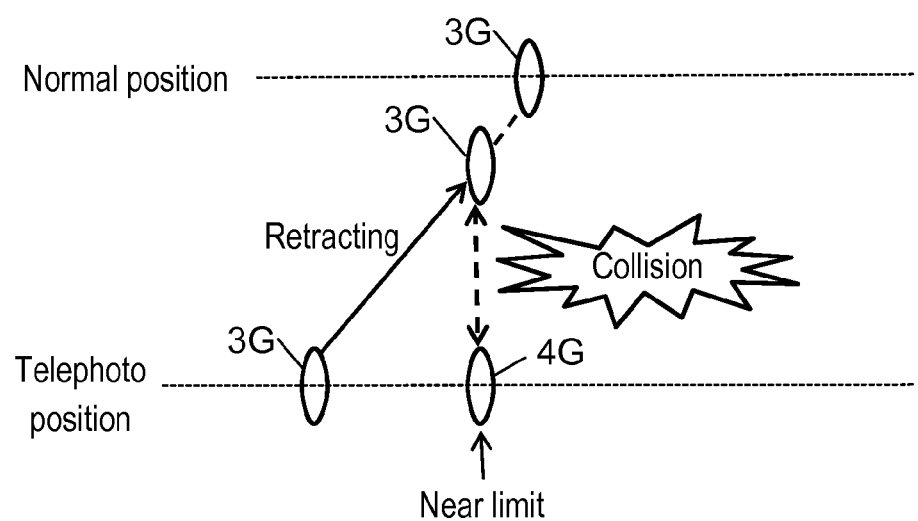
FIG. 4 is a diagram illustrating another problem when a termination in previous use of the digital camera according to the exemplary embodiment is an abnormal termination.

FIG. 4 is a diagram illustrating another problem when a termination in previous use of digital camera 100 is an abnormal termination. FIG. 4 shows each location of zoom lens group 3G and focus lens group 4G.

Suppose that when a termination in previous use is an abnormal termination, with zoom lens group 3G in the telephoto position and with focus lens group 4G in the "Near limit" position of the telephoto positions, the power is turned OFF. When the power switch of operating part 109 is operated to ON, in an attempt to retract zoom lens group 3G without retracting focus lens group 4G, zoom lens group 3G, when being retracted close to the normal position, may collide with focus lens group 4G in the "Near limit" position of the telephoto positions. Even when simultaneously retracted, zoom lens group 3G and focus lens group 4G are controlled separately to be driven, and thus there is a possibility of collision.

When zoom lens group 3G is retracted form the telephoto position to the retracted position, the lens position of zoom lens group 3G is into a position closer to an image than the "Near limit" position of the telephoto positions of focus lens group 4G, and thus there is a possibility of collision between zoom lens group 3G and focus lens group 4G.

Thus, when a termination in previous use is an abnormal termination, in order to avoid collision, initialization control of zoom lens groups 3G and 5G and focus lens group 4G is necessary.

Figure 5:
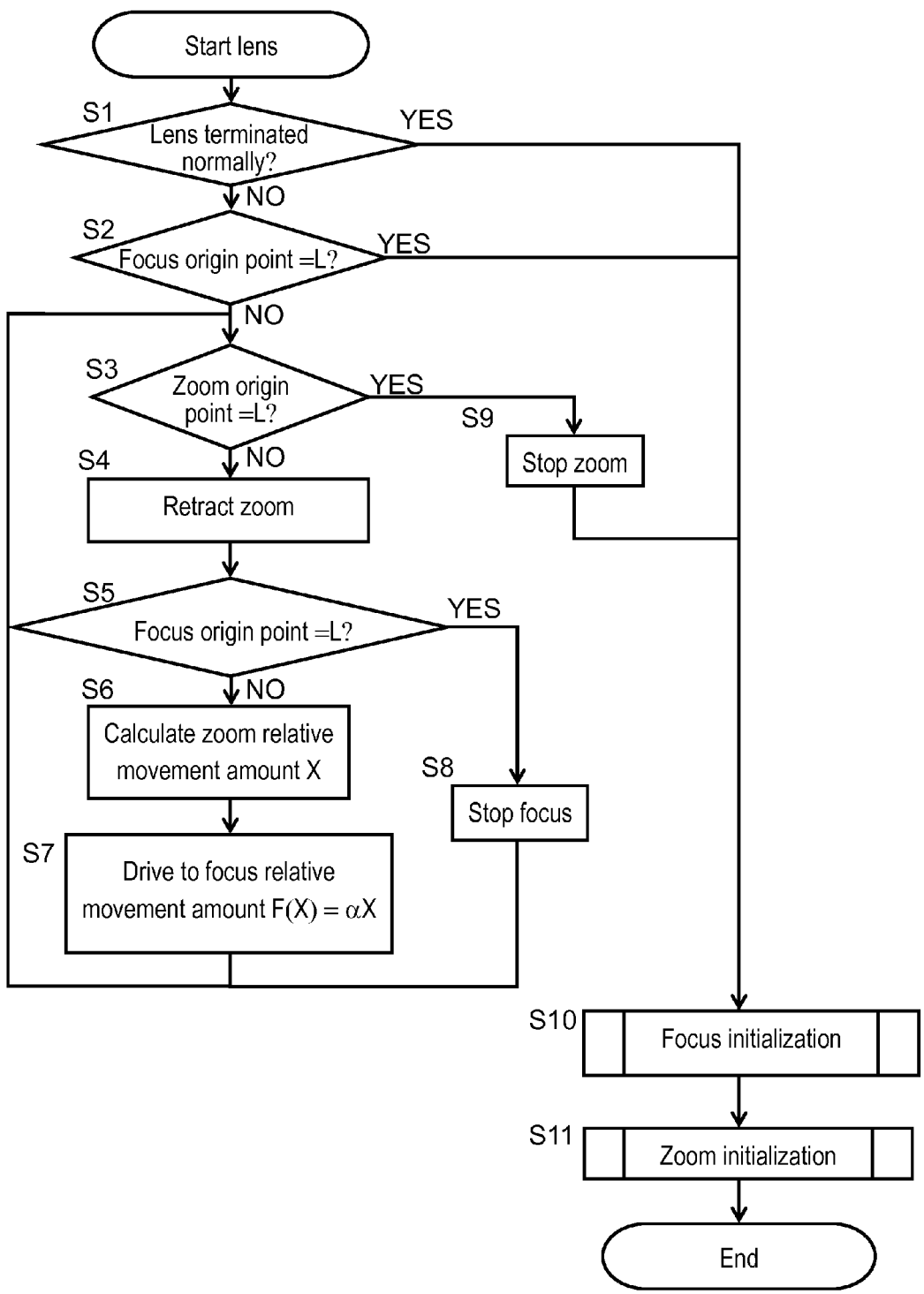
FIG. 5 is a flowchart of initialization control of focus lens group 4G and zoom lens groups 3G and 5G of the digital camera according to the exemplary embodiment.
Figure 6:
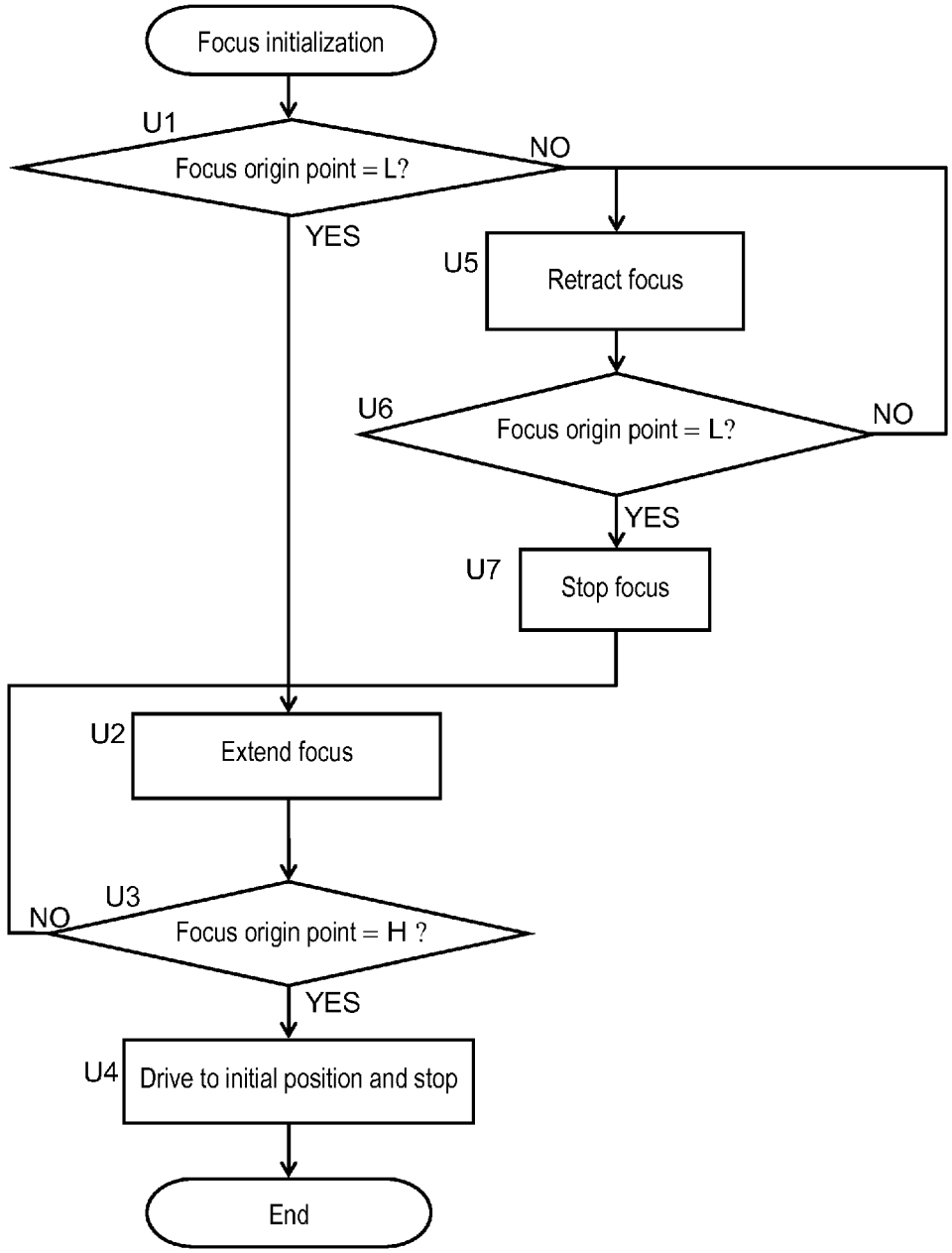
FIG. 6 is a flowchart of initialization control of zoom lens groups 3G and 5G of the digital camera according to the exemplary embodiment.
Figure 7:
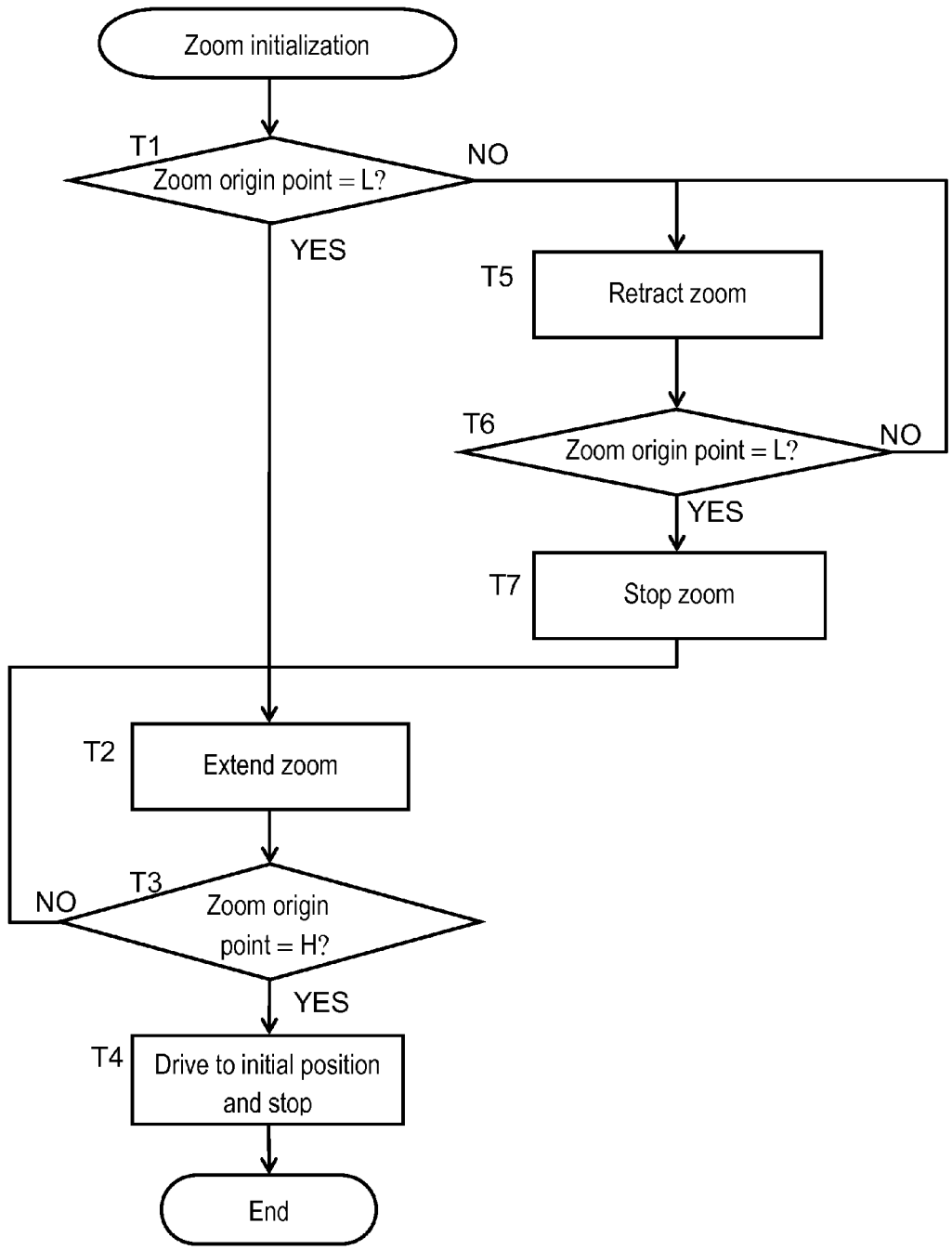
FIG. 7 is a flowchart of initialization control of focus lens group 4G of the digital camera according to the exemplary embodiment.

Hereinafter, description of an initialization operation of zoom lens groups 3G and 5G and focus lens group 4G in this exemplary embodiment is given with reference to FIGS. 5, 6, and 7. FIG. 5 is a flowchart of initialization control of focus lens group 4G and zoom lens groups 3G and 5G. FIG. 6 is a flowchart of initialization control of zoom lens groups 3G and 5G. FIG. 7 is a flowchart of initialization control of focus lens group 4G. Zoom lens groups 1G and 2G are controlled simultaneously with zoom lens groups 3G and 5G by zoom control unit 112 and zoom drive mechanism 113, and the description is omitted.

5. Initialization Operation of Lenses in Digital Camera 100 (when a Termination is Normal)

First, description is made of an initialization operation of zoom lens groups 3G and 5G and focus lens group 4G when the power switch of operating part 109 is operated to ON in a case where a termination in previous use is a normal termination.

Here, in the initialization operation of zoom lens groups 3G and 5G and focus lens group 4G, the lens positions of zoom lens groups 3G and 5G are moved to the wide positions as initial positions, and the lens position of focus lens group 4G is moved to the "∞" position of the wide positions as an initial position.

When digital camera 100 is terminated normally, "1" is stored as the flag indicating whether the termination is normal or not, in buffer memory 105. When digital camera 100 is terminated normally, the lens position of optical system 101 is in the retracted position.

(S1) When the power switch of operating part 109 is operated to ON, controller 106 determines whether a termination in previous use is a normal termination or not. Specifically, controller 106 checks the flag in buffer memory 105 indicating whether the termination is normal or not. When controller 106 has "1" that indicates a normal termination as the flag indicating whether the termination is normal or not (YES), the process proceeds to S10.

(S10) An initialization operation of focus lens group 4G is performed.

(S11) After the completion of the initialization operation of focus lens group 4G, an initialization operation of zoom lens groups 3G and 5G is performed.

The operation in S10 is described with reference to FIG. 6.

(U1) Controller 106 determines whether an output of the focus origin point detector is "L" or not. When the termination is normal, the output of the focus origin point detector is "L" (YES), and thus the process proceeds to U2.

(U2) Controller 106 drives focus lens group 4G in an extending direction.

(U3) Controller 106 transmits an extending direction control signal to the focus motor of focus control unit 111. The focus motor continues extending focus lens group 4G until a stop signal is transmitted from controller 106. Controller 106 determines whether the output of the focus origin point detector has become "H" or not. When the output of the focus origin point detector is "L" (NO), the process proceeds to U2. When the output of the focus origin point detector becomes "H" (YES), the process proceeds to U4.

(U4) When the output of the focus origin point detector becomes "H," focus lens group 4G is in the initial position. Controller 106 stops the movement of focus lens group 4G.

Each operation in U5 to U7 is described below as an operation when a termination is abnormal.

Next, an operation in S11 is described with reference to FIG. 7.

(T1) Controller 106 determines whether an output of the zoom origin point detector is "L" or not. When a termination is normal, the lens positions of zoom lens groups 3G and 5G are in the retracted positions, and the output is "L" (YES). Thus the process proceeds to T2.

(T2) Controller 106 transmits an extending direction control signal to the zoom motor of zoom control unit 112 to cause the zoom motor to drive zoom lens groups 3G and 5G in the extending direction. The zoom motor continues extending zoom lens groups 3G and 5G until a stop signal is transmitted from controller 106.

(T3) Controller 106 determines whether the output of the zoom origin point detector has become "H" or not. When the output of the zoom origin point detector is "L" (NO), the process proceeds to T2. When the output of the zoom origin point detector is "H" (YES), the process proceeds to T4.

(T4) Controller 106 extends zoom lens groups 3G and 5G by the zoom motor until the lens positions of zoom lens groups 3G and 5G reach the initial positions. When the lens positions of zoom lens groups 3G and 5G move to the initial positions, controller 106 stops extending.

Each operation in T5 to T7 is described below as an operation when a termination is abnormal.

Although processing in S11 is executed after processing in S10 in this exemplary embodiment, the processing in S10 and the processing in S11 may alternatively be executed in parallel. Parallel execution can further speed up lens initialization.

6. Initialization Operation of Lenses in Digital Camera 100 (when a Termination is Abnormal)

Next, description is made of an initialization operation of zoom lens groups 3G and 5G and focus lens group 4G when the power switch of operating part 109 is operated to ON in a situation where a termination in previous use is an abnormal termination.

When digital camera 100 is terminated abnormally, "0" is stored as a flag indicating whether the termination is normal or not, in buffer memory 105. When terminated abnormally, digital camera 100 cannot grasp which position the lens position of optical system 101 is.

(S1) When the power switch of operating part 109 is operated to ON, controller 106 determines whether the termination is normal or not. Controller 106 checks the flag in buffer memory 105 indicating whether the termination is normal or not. When controller 106 has "0" that indicates an abnormal termination as the flag indicating whether the termination is normal or not (NO), the process proceeds to S2.

(S2) Controller 106 determines whether an output of the focus origin point detector is "L" or not.

When the output of the focus origin point detector is "L" (YES), the process proceeds to S10, and then proceeds to S11.

In an initialization operation of focus lens group 4G in S10, the operation in U1, U2, U3, and U4 is performed as in the case of a normal termination described above.

After the completion of the initialization operation of focus lens group 4G, the following processing is executed.

(T1) Controller 106 determines whether an output of the zoom origin point detector is "L" or not. When the output of the zoom origin point detector is "L" (YES), the process proceeds to T2, and the operation in T2, T3, and T4 is performed as in the case of a normal termination described above. On the other hand, when the output of the zoom origin point detector is "H" (NO), the process proceeds to T5.

(T5) Since the output of the zoom origin point detector is "H" and the lens position cannot be grasped, the zoom lens groups 3G and 5G are driven in the retracting direction.

(T6) Controller 106 transmits a retracting direction control signal to the zoom motor of zoom control unit 112. The zoom motor continues retracting zoom lens groups 3G and 5G until a stop signal is transmitted from controller 106. Controller 106 determines whether the output of the zoom origin point detector has become "L" or not. When the output of the zoom origin point detector is "H" (NO), the process proceeds to T5. When the output of the zoom origin point detector becomes "L" (YES), the process proceeds to T7.

(T7) Controller 106 transmits a stop signal to the zoom motor of zoom control unit 112. The zoom motor stops retracting zoom lens groups 3G and 5G.

T2, T3, and T4 are executed after the processing in T7, and then initialization of zoom lens groups 3G and 5G is performed.

On the other hand, when the output of the focus origin point detector is "H" (NO) in S2, the process proceeds to S3.

(S3) Controller 106 determines whether the output of the zoom origin point detector is "L" or not. When the output of the zoom origin point detector is "L" (YES), the process proceeds to S9. When the output of the zoom origin point detector is "H" (NO), the process proceeds to S4.

(S4) Controller 106 transmits a retracting direction control signal to the zoom motor of zoom control unit 112.

(S5) Controller 106 determines whether the output of the focus origin point detector is "L" or not. When the output of the focus origin point detector is "L" (YES), the process proceeds to S8. When the output of the focus origin point detector is "H" (NO), the process proceeds to S6.

(S6) Controller 106 calculates a zoom relative movement amount X, which is an amount of movement of zoom lens groups 3G and 5G from start positions when the power switch of operating part 109 is operated to ON. The calculation of the zoom relative movement amount X is performed by using an output from the rotary encoder when the zoom motor is a DC motor, for example.

(S7) Controller 106 calculates a focus relative movement amount F(X) of focus lens group 4G, using the zoom relative movement amount X. Using the calculated focus relative movement amount F(X), controller 106 moves focus lens group 4G to a position of the focus relative movement amount F(X). Here, the focus relative movement amount $F(X)=\alpha X$ ($\alpha=10$).

In relation to the zoom relative movement amount of zoom lens groups 3G and 5G, the focus relative movement amount of focus lens group 4G is calculated to move focus lens group 4G. This is for preventing focus lens group 4G from colliding with zoom lens groups 3G and 5G.

Figure 8:
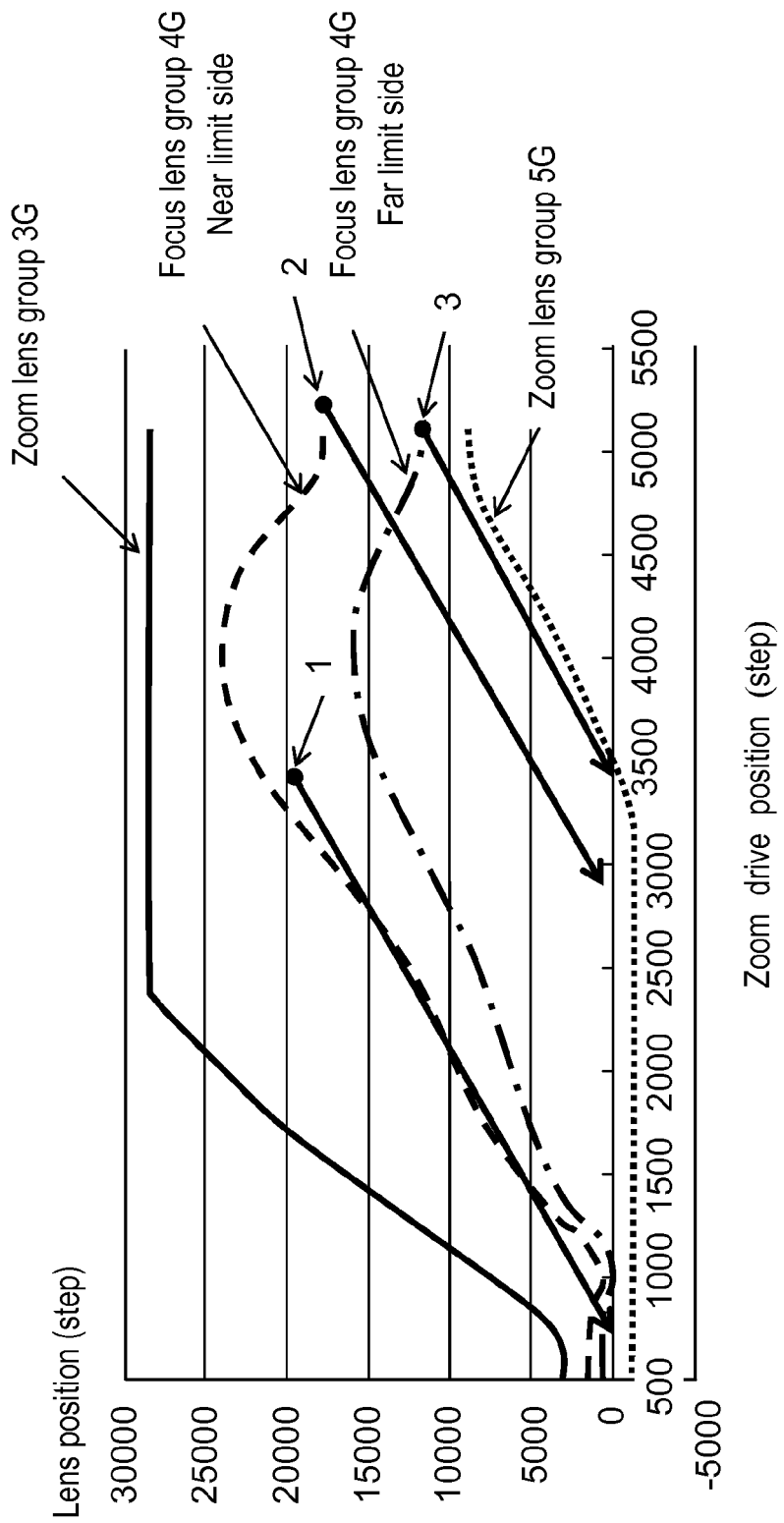
FIG. 8 is a diagram illustrating an example of movement of focus lens group 4G according to the exemplary embodiment.

Here, FIG. 8 is a diagram illustrating an example of movement of focus lens group 4G. With reference to FIG. 8, a relationship in movement between focus lens group 4G and zoom lens groups 3G and 5G is described. In FIG. 8, a horizontal axis is a zoom drive position and a vertical axis is a lens position, and a point at which the output of the focus origin point detector changes from "L" to "H" on the lens position is indicated by "0." The lens position on the "Near limit" side of focus lens group 4G and the lens position on the "Far limit" side of focus lens group 4G are controlled to be located between the lens position of zoom lens group 3G and the lens position of zoom lens group 5G to prevent collision. Here, in the case of an abnormal termination, even when the lens position of focus lens group 4G is any one of lens positions 1, 2, and 3, for example, the lens position is driven in an arrow direction from 1, 2, or 3 by being driven by the focus relative movement amount (F)X in accordance with the zoom relative movement amount X, so that the lens position of focus lens group 4G is located between the lens position of zoom lens group 3G and the lens position of zoom lens group 5G, thus being able to move without colliding.

After the operation in S7, controller 106 returns to S3.

(S8) Movement of focus lens group 4G is stopped.

(S9) Movement of zoom lens groups 3G and 5G are stopped by the zoom motor of zoom control unit 112.

Then, controller 106 performs the initialization operation of focus lens group 4G in S10 and the initialization operation of zoom lens groups 3G and 5G in S11.

In the initialization operation of focus lens group 4G (S10), there is a case where the output of the focus origin point detector is "H," and in that case, the following processing is executed.

(U1) Controller 106 determines whether the output of the focus origin point detector is "L" or not. When the output of the focus origin point detector is "H" (NO), the process proceeds to U5.

(U5) Controller 106 causes focus lens group 4G to be driven in the retracting direction. Controller 106 transmits a retracting direction control signal to the focus motor of focus control unit 111. The focus motor continues retracting focus lens group 4G until the focus motor is stopped by controller 106.

(U6) Controller 106 determines whether the output of the focus origin point detector has become "L" or not. When the output of the focus origin point detector is "H" (NO), the process proceeds to U5. When the output of the focus origin point detector becomes "L" (YES), the process proceeds to U7.

(U7) Controller 106 stops the driving of focus lens group 4G by the focus motor of focus control unit 111.

Next, U2, U3, and U4 are executed.

In this exemplary embodiment, a case where the battery or the like of power source 110 as a power supply source is removed while the power is ON has been described as an abnormal termination, for example, which is not limiting. For example, a case where buffer memory 105 is cleared because digital camera 100 has not been used for a long time, for example, may be an abnormal termination.

In this exemplary embodiment, description has been made with α=10, which is not limiting. In FIG. 8, a range that a can take is a slope of a straight line drawn from any lens position of focus lens group 4G enclosed by the Far limit side and the Near limit side of focus lens group 4G to a position at which the lens position becomes 0, not colliding with the lens positions of zoom lens groups 3G and 5G.

7. Effects

As described above, in this exemplary embodiment, digital camera 100 includes focus lens group 4G, zoom lens group 3G disposed on a subject side of the focus lens group 4G, zoom lens group 5G disposed on an image side of focus lens group 4G, a focus motor configured to drive focus lens group 4G, a zoom drive mechanism 113 configured to drive zoom lens group 3G and zoom lens group 5G, a focus origin point detector provided in a movable range of zoom lens group 5G for detecting a focus origin point of focus lens group 4G, and controller 106 configured to control the focus motor and zoom drive mechanism 113. When controller 106 loses track of a position of focus lens group 4G, the controller drives focus lens group 4G in accordance with a relative movement amount X of zoom lens group 3G and zoom lens group 5G by zoom drive mechanism 113 to move focus lens group 4G to the focus origin point.

For the movement of focus lens group 4G to the focus origin point, αX (α=10) is calculated with respect to the relative movement amount X of zoom lens group 3G and zoom lens group 5G to move focus lens group 4G.

After controller 106 moves focus lens group 4G to the focus origin point, controller 106 performs an operation of driving focus lens group 4G to an initial position, and then performs an operation of driving zoom lens group 3G and zoom lens group 5G to initial positions.

With this, digital camera 100 can prevent collision between the lenses when the controller loses track of the position of focus lens group 4G.

What is claimed is:

1. An imaging apparatus comprising:
   a focus lens;
   a front zoom lens disposed on a subject side of the focus lens;
   a rear zoom lens disposed on an image side of the focus lens;
   a focus drive unit configured to drive the focus lens;
   a zoom drive unit configured to drive the front zoom lens and the rear zoom lens;
   a focus origin point detector provided in a movable range of the rear zoom lens, configured to detect a focus origin point of the focus lens; and
   a controller configured to control the focus drive unit and the zoom drive unit,
   wherein the controller controls the focus drive unit to move the focus lens to the focus orgin point by moving the focus lens a relative movement amount F(X), which is a constant ratio with respect to a relative zoom movement amount X between the front zoom lens and the rear zoom lens, while moving the front zoom lens and the rear zoom lens in the relative zoom movement amount X by the zoom drive unit, when the controller loses a position of the focus lens.

2. The imaging apparatus according to claim 1, wherein, the relative movement amount F(X) is αX, (α=10).

3. The imaging apparatus according to claim 1, wherein after the controller moves the focus lens to the focus origin point, the controller performs an operation of driving the focus lens to an initial position, and then performs an operation of driving the front zoom lens and the rear zoom lens to initial positions.

* * * * *